United States Patent [19]
Brazas, Jr.

[11] Patent Number: 5,412,743
[45] Date of Patent: May 2, 1995

[54] METHOD AND APPARATUS FOR AMPLITUDE MODULATION OF A LASER BEAM

[75] Inventor: John C. Brazas, Jr., Hilton, N.Y.

[73] Assignee: Eastman Kodak Company, Rochester, N.Y.

[21] Appl. No.: 163,206

[22] Filed: Dec. 6, 1993

[51] Int. Cl.⁶ .............................................. G02F 1/01
[52] U.S. Cl. .......................................... 385/2; 385/10
[58] Field of Search .......................... 385/1–4, 385/8–10, 15, 16, 18, 31, 37

[56] References Cited

U.S. PATENT DOCUMENTS

| | | | |
|---|---|---|---|
| 3,898,585 | 8/1975 | Heidrich et al. | 385/2 X |
| 3,924,931 | 12/1975 | Cheo | 385/8 |
| 3,944,812 | 3/1976 | Hattori et al. | 385/2 X |
| 4,006,963 | 2/1977 | Baues et al. | 385/10 X |
| 4,039,249 | 8/1977 | Kaminow et al. | 385/10 X |
| 4,047,795 | 9/1977 | Hughes et al. | 385/37 |
| 4,415,226 | 11/1983 | Verber et al. | 385/10 |
| 4,592,043 | 5/1986 | Williams | 385/18 X |
| 4,767,169 | 8/1988 | Teng et al. | 385/2 |
| 5,131,060 | 7/1992 | Sakata | 385/2 |
| 5,193,130 | 3/1993 | Nishiwaki et al. | 385/14 |

FOREIGN PATENT DOCUMENTS 63-235904 9/1988 Japan .................................... 385/10

OTHER PUBLICATIONS

R. Magnusson and S. Wang, "New principles for optical filters," Appl. Phys. Lett., 61, (9) 1022–1024 (Aug. 1992).

R. Reinisch, P. Vincent, M. Neviere, and E. Pic, "Fast Pockels light modulator using guided wave resonance," Appl. Optics, 24, (13) 2001–2004, (1985), Jul.

I. Akhmedzhanov, A. Prokhorov, and E. Shcherbakov, "Linear thin-film Bragg modulator", Elect. Lett., 20, (23) 967–968 (Nov. 1984).

D. R. Robello et al., "Linear polymers for nonlinear optics. 2-Synthesis and electro-optical properties of polymers bearing pendant chromophores with methylsulfonyl electron-a cceptor groups," Chemistry of Materials, (1992), 4., Publ. Amer. Chem. Soc, pp. 425–435.

L. Li et al., "Fabrication of photoresist masks for submicrometer surface relief gratings," Proc. SPIE 835, 72–82, Aug. 1987.

Tamier, T. editor, "Topics in Applied Physics, vol. 7, Integrated Optics," Chapter 3, Beam and Waveguide Couplers, pp. 83–137, Springer–Verlag (1975).

Primary Examiner—John D. Lee
Attorney, Agent, or Firm—Raymond L. Owens

[57] ABSTRACT

Apparatus and method for amplitude modulation of laser light by means of an electro-optic waveguide having a grating coupler, the length of the grating being short relative to the coupling length and to the waist of the incident laser beam.

14 Claims, 6 Drawing Sheets

METHOD AND APPARATUS FOR AMPLITUDE MODULATION OF A LASER BEAM

FIELD OF THE INVENTION

This invention relates to the field of optical waveguides, and more particularly to electrically-responsive waveguides. Specifically, the invention relates to a modulating waveguide having an increased dynamic range of modulation.

BACKGROUND OF THE INVENTION

Modulation of laser beam power by means external to the laser cavity is advantageous for maintaining stability of the wavelength and may provide much higher modulation rates and more accurate power selection in comparison to intracavity means. Several modulator systems using waveguide gratings and electrooptic effects are known. Selection of a system depends on the desired characteristics of the modulator, including speed and modulation of power amplitude, and the ease of inserting the device in an optical system.

The principle of modulation using guided-mode resonance properties of waveguide gratings (i.e., the phenomenon of coupling from a radiative mode to a guided mode), is disclosed by R. Magnusson and S. Wang in "New principles for optical filters," Appl. Phys. Lett., 61, 1022–1024 (1992). Several potential applications for this type of modulator me suggested including: special filters (static and tunable), low power switching units, line-narrowing reflectors for laser cavities and possibly integrated-optics. A modeled system is used to demonstrate the example of the wavelength sensitivity of coupling resonance. The authors indicate that the width of the response curve can be tuned by controlling the depth of the grating grooves which in turn increases the attenuation coefficient of the grating coupler.

A light modulator which uses coupling resonance where an electro-optic material is deposited on the grating surface and supports a mode of propagation is disclosed by R. Reinish et al. in "Fast Pockels light modulators using guided wave resonance," Appl. Optics, 24, 2001–2004, (1985). The system was modeled for a change in the refractive index resulting from adjusting the applied voltage while all other parameters were held constant. The dependence of the input coupling efficiency on applied voltage was observed to be Lorentzian and the width of the response increased with a thinner waveguide layer or an increase in the mode of the guided beam. Again, the attenuation coefficient of the grating coupler is increased by changing these parameters.

Bragg modulation using the electro-optic effect also has been disclosed by Arhmedzhanov et al. in "Linear thin-film Bragg modulator," Elect. Lett., 20, 967–968 (1984). However, this method does not utilize the coupling resonance between radiative and guided modes; rather, the optical beam modulated is confined within the waveguide.

PROBLEMS TO BE SOLVED BY THE INVENTION

The cited references indicate that electro-optic waveguide modulators can be used as electrical-to-optical signal converters. Such conversion is useful in, for example, the recording of data by lasers on optical recording media. Fortuitously, such devices are capable of extremely high modulation rates, perhaps as high as $10^{10}$ Hz, which are necessary to many recording applications.

However, a serious shortcoming to the practical application of organic electro-optic waveguide modulators is their undesirable response. This stems from two factors: (1) the very low sensitivity of the index of refraction of known electro-optic organic materials to relatively large changes in electric field; (the electro-optic coefficient, r33) and (2) the common practice of manipulating coupling length ($L_c$) or beam width ($W_o$) without regard to grating length ($L_c$). The result is that known organic electro-optic waveguides have a distribution of input coupling angles which is broad with respect to their decoupling potential. Thus, only relatively shallow modulation is possible with such systems.

Means to increase the dynamic range of operation and the depth of modulation of the coupled light will extend the use of waveguide modulators to new applications. When this type of modulator is used for continuous adjustment of the amplitude or on-off selection of an optical beam, the dependence of the input coupling efficiency on applied voltage (or "response") will provide an extended dynamic range of input coupling from about zero to a maximum signal within the range of electro-optic tuning. The invention achieves an extended dynamic range by narrowing the width of the response peak.

SUMMARY OF THE INVENTION

The apparatus of the invention for modulating the amplitude of a laser light beam, comprises:
 a) a waveguide for propagation of a laser beam, comprising an electro-optic material having two surfaces, the index of refraction of said material being changeably responsive to a varying electric field;
 b) means for establishing an electric field within said waveguide;
 c) a diffraction grating for coupling radiative laser light into said waveguide, the length of said grating being shorter than its coupling length; and
 d) means for varying said electric field to vary said index of refraction, thereby modulating the amplitude of light admitted to said waveguide in response to said variations in said electric field.

The method of the invention comprises modulating the amplitude of incident laser radiation transmitted by a waveguide which comprises:
 impinging said laser radiation onto a diffraction grating of a waveguide comprising an electro-optic material, said radiation being impinged on said grating at the angle of maximum coupling for said radiation and electro-optic material, thereby producing maximum amplitude of coupled radiation, the length of said grating being less than the waist diameter of the incident radiation and less than the coupling length of said radiation with respect to said grating;
 establishing an electric field across said waveguide; and
 changing said field to change the refractive index of said electro-optic material, whereby the amplitude of said impinging radiation is changed to a value less than said maximum amplitude.

ADVANTAGEOUS EFFECT(S) OF THE INVENTION

In accordance with the present invention, a single waveguide provides a range of amplitude modulation from about zero to 100 percent of the guided laser beam. An improved depth of modulation and a superior signal-to-noise ratio are achievable with the novel apparatus and method. The apparatus can employ very short waveguides, which is an important advantage in miniaturization of components.

DETAILED DESCRIPTION OF THE INVENTION

The invention is disclosed as being embodied preferably in a thin-film dielectric waveguide. Because the features of a thin-film dielectric waveguide are generally known, the description which follows is directed in particular only to those elements forming part of or cooperating directly with the disclosed embodiment. It is to be understood, however, that other elements may take various forms known to a person of ordinary skill in the art.

Figure 1:
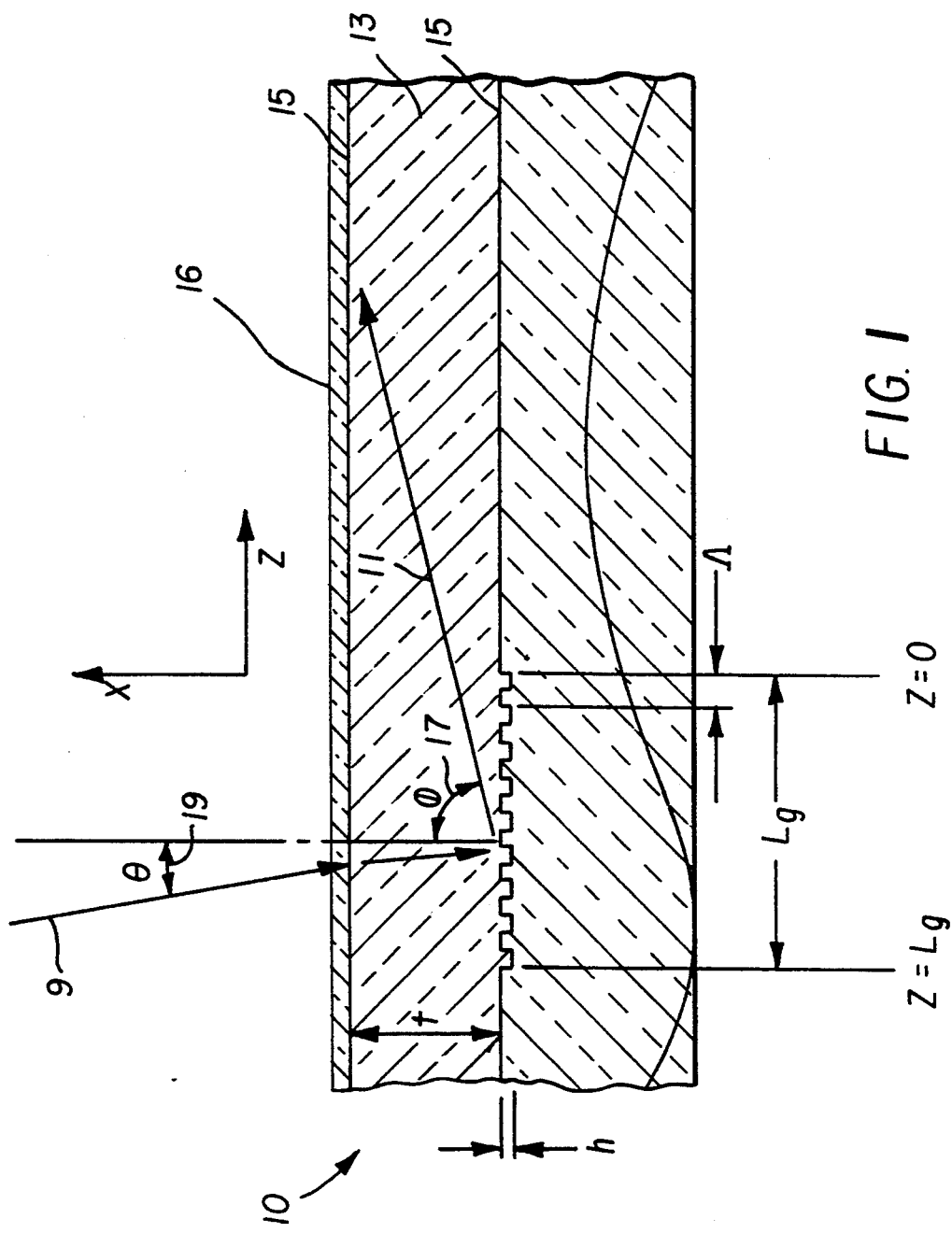
FIG. 1 shows the coupling of a laser beam from radiative mode to guided mode in a wave by means of a diffraction grating.

Referring now to the drawings, FIG. 1 shows in cross-section laser beam 9 entering a diffraction-coupling waveguide apparatus 10, being coupled into the waveguide 13, and propagated by it. The solid-line ray trace 11 within waveguide 13 represents the propagation of a plane wave contained within waveguide 13 by total internal reflection at waveguide boundary surface 15. A propagation constant, $\beta$, characterizing the guided light is defined $$\beta = \frac{2\pi}{\lambda} n_f \sin(\phi) \quad (1)$$

where $\lambda$, is the wavelength of light, $n_f$ is the waveguide refractive index and $\phi$ is the propagation angle 17. Based on the dispersion relation, discrete values of $\beta$ are allowed and are referred to as guided modes.

Coupling of a radiative mode to a guided mode can be understood by the basic diffraction principles of a grating. The corrugation of the grating is located at one surface 15 of waveguide 13 so that for the proper incident angle a diffracted beam will be at propagation angle $\phi$, 17, within the waveguide to allow the exchange of energy between radiative and guided modes. The condition of coupling is based on the compensation of the difference between the propagation constants for radiative and guided modes, $\beta_i$ and $\beta$, respectively, where $\beta_i$ is the incident radiation mode defined as $$\beta_i = \frac{2\pi}{\lambda} n_c \sin(\theta) \quad (2)$$

with $n_c$ being the refractive index of cladding 16. The coupling condition is satisfied through the use of a grating according to the grating equation, expressed as $$\beta_i = \beta + \frac{m}{2\pi \Lambda} \quad (3)$$

where m is the diffraction order ($-1$ for input coupling) and $\Lambda$ is the period of the grating grooves and is usually selectable for specifying input-coupling angle $\Theta$, 19.

FIG. 1 also shows the important parameters $L_g$, the length of the coupling grating; z, the waveguide dimension in the direction of propagation of the light beams, z=0, the beginning of the noncorrugated section of the waveguide; h, the depth of the grating corrugations; and t, the thickness of the waveguide.

Figure 2:
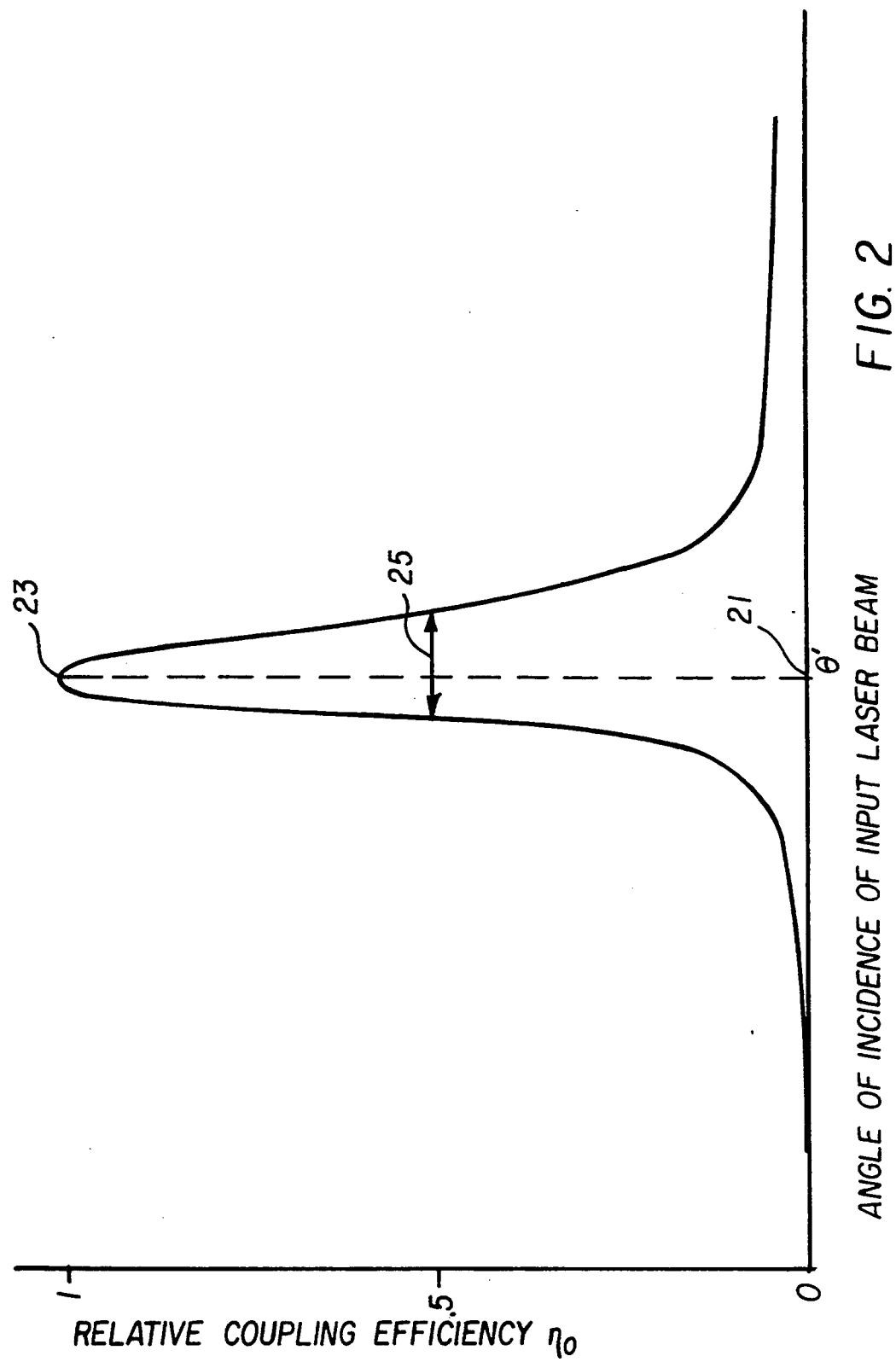
FIG. 2 shows the normalized efficiency of coupling of a laser beam as a function of angle incident to a waveguide.

FIG. 2 is a plot of normalized coupling efficiency $\eta_o$ as a function of the angle of incidence of input laser beam 9. The peak or maximum coupling 23 occurs at the optimum input coupling angle $\Theta'$, 21. For a given incident beam and waveguide grating, there will be a narrow range of angles over which light can be coupled into the waveguide. The full-width-half-maximum (FWHM) of the input-coupling efficiency plot for the angular scan is termed the angular width $\Delta\Theta$, 25.

If the proper incident angle 0 is selected, a diffracted order will be supported within the waveguide. However, the grating also leaks the guided wave out of the waveguide by grating diffraction. So the coupling efficiency is the net result of the balance between input and leakage. The mathematical description of this balance and its implication to the angular width are important to an understanding of the invention.

Let A be the complex amplitude of the guided wave such that $$A(z) = a(z) \exp\left\{ i\left( \frac{2\pi}{\lambda} n_c \sin\theta' + m\lambda \right) \right\} \frac{2\pi}{z}, \quad (4)$$

where $\Theta'$ is the optimum input-coupling angle 21 (i.e., the incident angle where maximum intensity is input-coupled), m is the diffraction order responsible for input-coupling, and a(z) is the reduced field amplitude of the guided wave. The amount of energy coupled into the waveguide depends on the field amplitude of the guided wave at z=0 in FIG. 1. As long as the grating is not very deep so that the transition from the grooved region to the ungrooved region of the waveguide does not introduce significant reflection and scattering, the guided wave energy will remain guided beyond the edge of the grating, z=0. Thus, the input-coupling efficiency, $\eta$, is given by $$\eta = C|a(O)|^2, \quad (5)$$

where C is a constant. The reduced field amplitude a(z) obeys the following differential equation:

$$\frac{da(z)}{dz} = -(\alpha + i\Delta\beta)a(z) + cq(z) \quad (6)$$

where $-L_g = Z = 0$ and $\alpha$ is the rate of decay for the guided-wave amplitude, $$\Delta\beta = \frac{2\pi}{\lambda} n_c(\sin\theta - \sin\theta'), \quad (7)$$

and c is a constant having dimension of inverse length. The rate of change of the guided wave amplitude as described in Eq. (6) has three contributions: the external input source q(z), the radiative loss due to grating diffraction, and the phase mismatch between the guided wave and the input-diffracted wave. If the differences between the incident angle $\Theta$ and the optimum input-coupling angle $\Theta'$ (i.e., the angular detuning) is small, Eq. (4) can be rewritten as $$\Delta\beta = \frac{2\pi}{\lambda} n_c \cos\theta \Delta\theta \quad (8)$$

To determine the influence of the grating length and the angular detuning on the input-coupling efficiency, (6) must be solved. Because there is no energy in the guided wave before the grating, the initial condition is $a(-L_g) = 0$. The solution of Eq. (6) is found to be $$a(z) = c\exp\{-(\alpha + i\Delta\beta)z\} \int_{-Lg}^{z} \exp\{(\alpha + i\Delta\beta)z'\}q(z')dz' \quad (9)$$

Therefore, from Eq. (5), $$\eta = C' \left| \int_{-Lg}^{0} \exp\{(\alpha + i\Delta\beta)z\}q(z)dz \right|^2, \quad (10)$$

or $$\eta = C' \left| \int_{-\infty}^{\infty} \left[ \text{rect}\left(-\frac{z}{L_g}\right)\exp(\alpha z)q(z) \right] \exp(i\Delta\beta z)dz \right|^2 \quad (11)$$

a rect function, where $$\text{rect}(x) = \begin{cases} 1, & 0 < x < 1; \\ 0, & \text{else} \end{cases} \quad (12)$$

and $$C' = C|c|^2 \quad (13)$$

Formulae (10) and (11) are equivalent.

Formula (10) gives a general expression to link together the finite incident beam, the finite grating aperture, and the intrinsic property of the grating. There are three characteristic lengths explicitly or implicitly involved in Eqs. (10) or (11), the actual grating length $L_g$, the width of the incident beam, and the intrinsic coupling length of the grating $L_c$ defined as $$L_c = 1/\alpha. \quad (14)$$

All three characteristic lengths affect $\Delta\Theta$, the angular width 25 of the input-coupling. When the relative lateral positioning of the incident beam and the grating aperture are adjusted to achieve maximum coupling efficiency, the angular width can be dominated by one of the characteristic lengths when it is much less than the other two.

Thus, there are three limiting cases. In the following comparisons, the incident beam is Gaussian with a waist $\Omega_o$ (radius) measured along the z-axis in the plane of the grating. For convenience, the efficiency of input-coupling has been normalized such that at zero detuning the efficiency is unity. The symbol for this normalized coupling efficiency is $\Theta_0$.

Case 1. $\omega_0 << L_c$ and $\omega_0 << L_g$

In this case, the angular width of the incident beam controls the sign of $\Delta\Theta 25$, and from Eq. (10).

$$\eta_0 = \exp\left\{ -\frac{1}{2} \Delta\beta^2\omega_0^2 \right\}, \quad (15)$$

and $$\Delta\theta = \frac{\sqrt{2\ln 2}}{\pi} \frac{\lambda}{\omega_0 n_c \cos\theta} \quad (16)$$

where $\Delta\Theta$ is the angular width full-width half maximum 25 of input coupling efficiency.

Case 2. $L_c << \Omega_0$ and $L_c << L_g$

In this case the intrinsic angular width (or intrinsic coupling length $L_c$) of the grating dominates, yielding $$\eta_0 = \frac{\alpha^2}{\alpha^2 + \Delta\beta^2} \quad (17)$$

and $$\Delta\theta = \frac{1}{\pi} \frac{\lambda}{L_c n_c \cos\theta} \quad (18)$$

Case 3. $L_g << \omega_0$ and $L_g << L_c$

In this case, the angular width $\Delta\Theta$, 25, is dominated by the length of the grating aperture, such that $$\eta_0 = \text{sinc}^2\left( \frac{\Delta\beta L_g}{2} \right) \quad (19)$$

and $$\Delta\theta = \frac{2x_0}{\pi} \frac{\lambda}{L_g n_c \cos\theta} \quad (20)$$

where $x_0 = 1.391557$ is the root of equation $\text{sinc}^2(x) = 0.5$ (the half-max point on the curve). Thus, in the three limiting cases, the dependencies of coupling efficiency on angular detuning are, respectively, Gaussian, Lorentzian, and sinc-squared, and the angular width $\Delta\Theta$, 25, is inversely proportional to the dominating dimension of each case, as is expected from the principles of diffraction.

Figure 3:
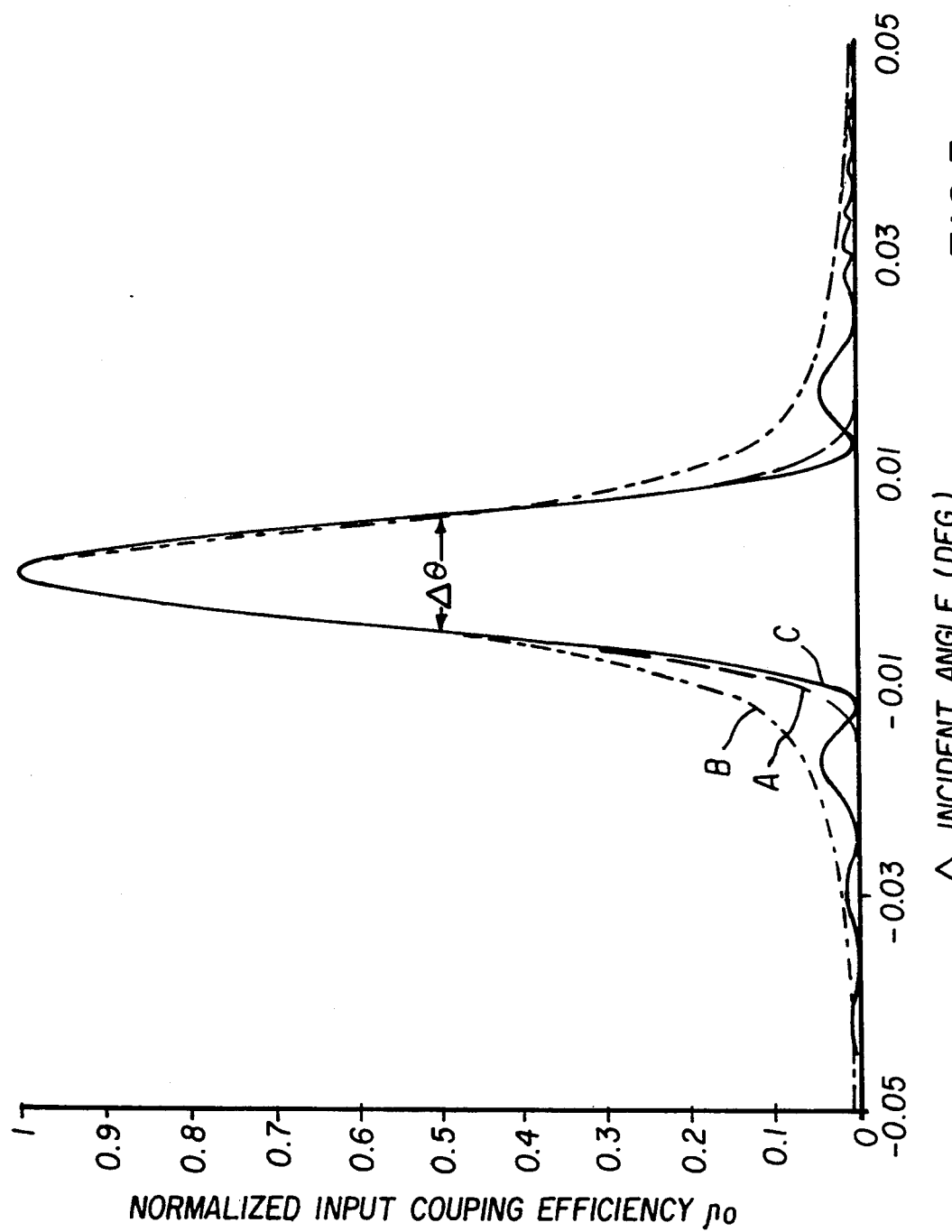
FIG. 3 shows response curves for the three cases in which the beam width, coupling length, or grating length respectively is small relative to the other two parameters.

FIG. 3 shows plots of these three functions as Curves A, B, and C, respectively. Curve C follows the sinc² function, the power of which shows clearly in the narrow response range and zero coupling (maximum amplitude modulation) which can be achieved within this narrow response range. Zero coupling is not possible in this range with either of the other two conditions (Curves A and B).

Additionally, the Gaussian case (Curve A) although it is theoretically capable of null modification, is not deemed practical for microminiature applications. A waveguide grating of, for example, 100 m length would require a Gaussian laser beam having waist $\omega_0$ 100 $\mu$m. The subject invention (Curve C) does not suffer this constraint and in fact benefits from a relatively large laser beam ($L_g$ $\omega_0$).

In choosing the exact length of the grating, the input efficiency and angular response required must be considered. Improvement in the angular response of the grating coupler is gained at some expense in the efficiency of coupling. However, in many practical systems, reduced intensity of the coupled laser beam is not a disadvantage.

A feature of the invention is that the effective length of the grating $L_g$ be shorter than the coupling length $L_c$ (Case 3). This can be achieved in any of three ways. In a first embodiment (not shown), the width of the incident laser beam can be masked to allow only a small portion of its Gaussian intensity distribution to impinge on the coupling grating. The input thus approximates a uniform rather than Gaussian intensity distribution. In a second embodiment (not shown) a sub-optimally long grating can itself be masked to reduce its functional length. The incident beam is thus effectively narrowed, although in this embodiment some grating leakage of coupled radiation can occur under the mask. In the third and preferred embodiment, the waveguide is designed with its grating length $L_g$ shorter than its coupling length $L_c$ and the beam waist $\Omega_o$. Where ample input radiation is available, it is possible to make $L_g$ very much smaller than $L_c$, even as small as 1/100 or less. In the limiting case, the grating could be only a few cycles long.

Figure 4:
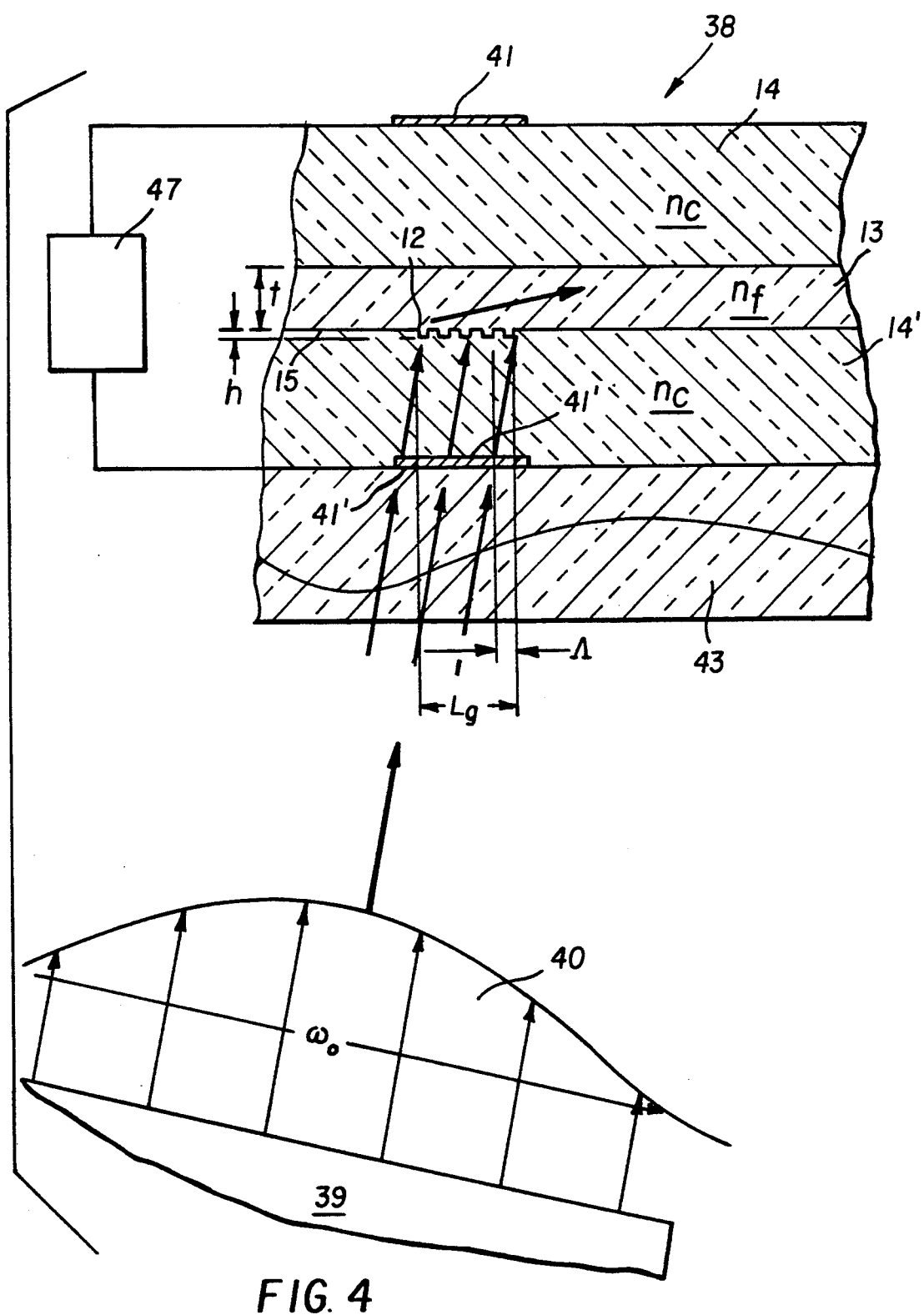
FIG. 4 shows a cross-section of an apparatus of the invention.

FIG. 4 shows the preferred embodiment 38 of a waveguide apparatus of the invention. A thin-film optical waveguide 13 of refraction index $\eta_f$ and thickness t is sandwiched between two transparent buffer or cladding layers 14 and 14' of refraction index $n_c$, wherein $n_c < n_f$. This assures the existence of a critical internal angle of reflection, permitting waveguide 13 to propagate light without significant leakage. The material of waveguide 13 is an electro-optic organic polymer bearing pendant chromophores with methylsulfonyl electron-acceptor groups of the type disclosed by Robello et al. in "Linear polymers for nonlinear optics. 2. Synthesis and electro-optical properties of polymers bearing pendant chromophores with methylsulfonyl electron-acceptor groups," Chemistry of Materials, (1992), 4., pub. Amer. Chem. Soc. In one surface 15 of waveguide 13 is located diffraction grating 12 of height h, length $L_g$, and pitch A. On the upper and lower surfaces of cladding layers 14 and 14', respectively, are attached upper and lower planar electrodes 41 and 41', lower electrode 41' being a transparent conductor of refractive index $n_c$, such as, for example, indium tin oxide. For mechanical support, a transparent substrate 43 of refractive index $n_s$ is provided in optical contact with lower electrode 41'. A laser light beam 40 of waist $\omega_0$ is provided at optimum incident angle $\Theta'$ to waveguide apparatus 38 over the full length of diffraction grating $L_g$ 12, wherein $L_g$ is much smaller than $\omega_0$. The length of the diffraction grating $L_g$ is also less than the calculated coupling length L of laser light beam 40 onto diffraction grating 12. Upper and lower planar electrodes 41 and 41' are connected to electrical signal generator 47, which may take the form of, for instance, an optical recording drive.

Figure 5:
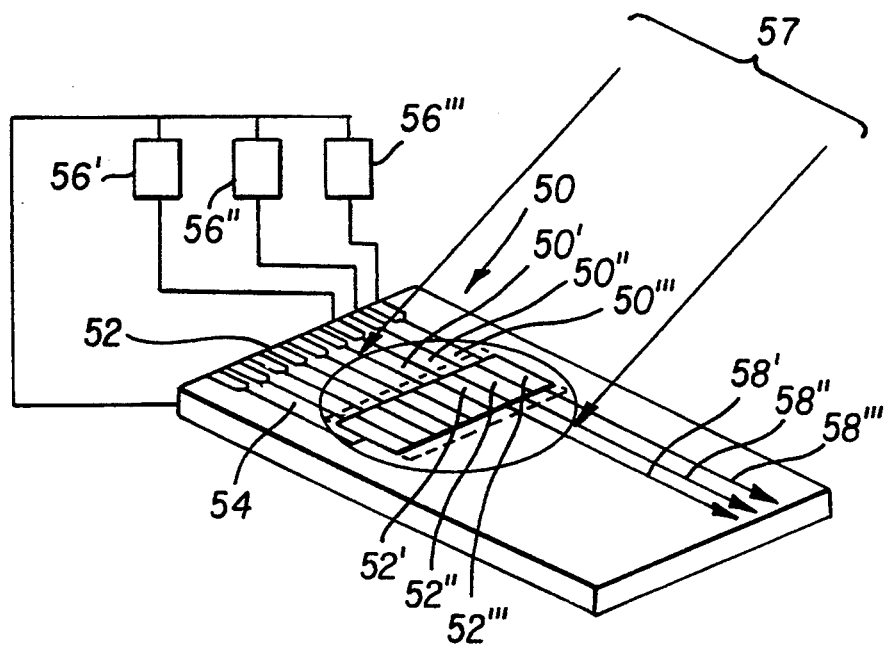
FIG. 5 shows a further embodiment of an apparatus of the invention comprising multiple independently modulatable waveguide segments within a single waveguide structure.

Other embodiments are shown in FIGS. 5 through 8. FIG. 5 shows an isometric view of a grating-coupled waveguide 50, modified to function as a plurality (in this example, three) of parallel waveguide segments 50', 50", and 50''' by subdividing upper electrode 52 into smaller upper electrode segments 52', 52", and 52'''. Lower electrode 54 is common to the plurality of waveguides. Each of upper electrode segments 52', 52", and 52''', as well as common lower electrode 54 is connected to an independent electrical signal source 56', 56", and 56'''. This electrode pattern allows incident laser beam 57 to be divided into a plurality of guided beams 58', 58" and 58''', each modulated by independent control of the applied voltage for each electrode segment 52', 52", and 52'''.

Figure 6:
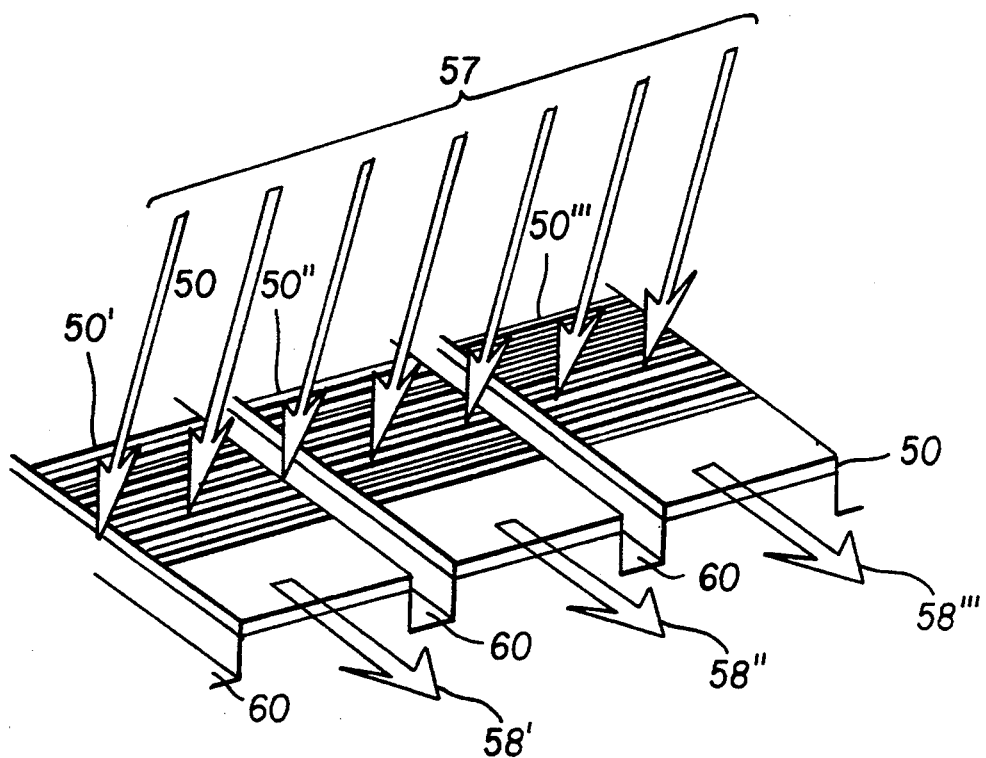
FIG. 6 shows a means for maintaining optical isolation between the waveguide segments FIG. 5.

For relatively wide waveguide segments 50', 50", and 50''' the lateral overlap of the independently guided beams 58', 58", and 58''' within waveguide 50 can be ignored. However, if a higher resolution (smaller width) is desired, a means of confining the guided beam for each segment is needed. FIG. 6 shows the use of channel grooves 60 between the segments for beam confinement and modulation isolation. The groove depth preferably is greater than the thickness of the waveguide. Also, the width of the groove should be great enough to prevent evanescent coupling between adjacent waveguide segments. Using this design, it is possible to form modulator segments less than 100 $\mu$m wide and possibly near to 10 $\mu$m wide.

Figure 7:
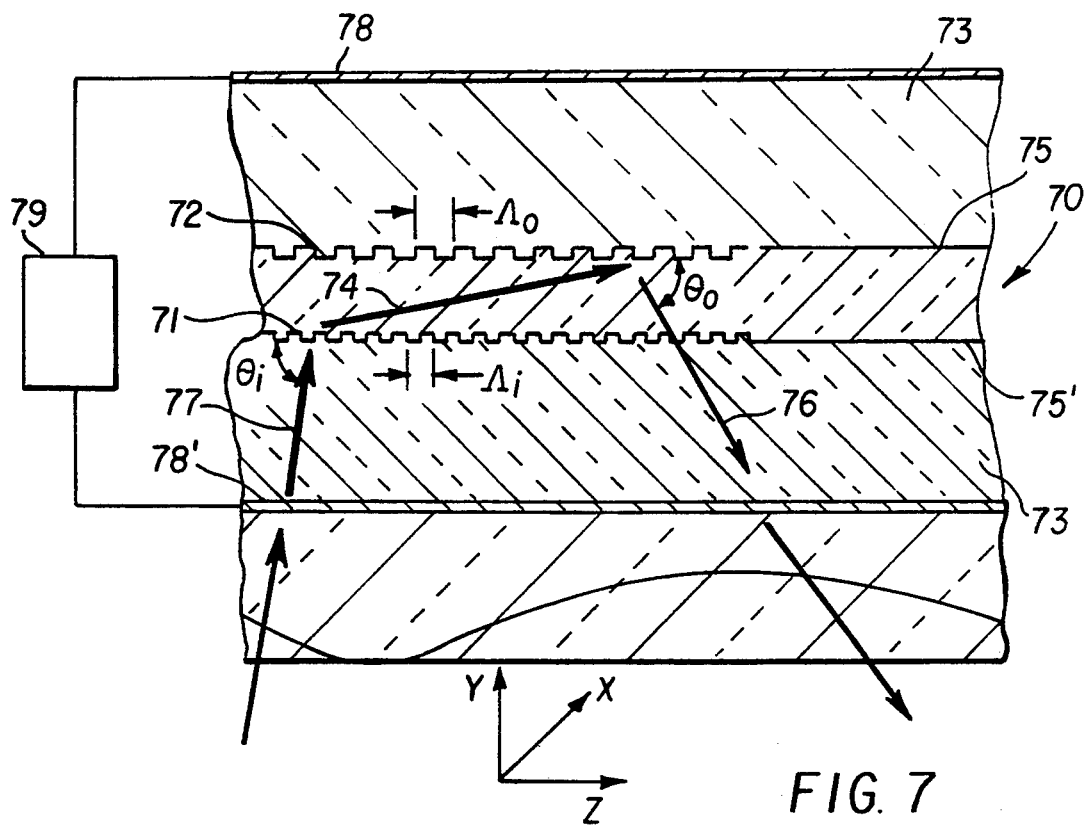
FIG. 7 shows a further embodiment of the apparatus of the invention comprising overlapping input d output gratings.

FIG. 7 shows a waveguide modulator 70 according to the invention having input coupling grating 71 with addition of a second grating 72 for output coupling of guided laser beam 74. The use of input and output grating couplers in a common waveguide is disclosed in, for example, U.S. Pat. No. 3,924,931. In FIG. 7, input grating 71 and output grating 72 are shown overlapping each other in opposite walls 75 and 75' of waveguide modulator 70. The pitch $\Lambda_0$ of output grating 72 should be different from the pitch $\Lambda_i$ of input grating 71 so that output laser beam 76 can be distinguished from input laser beam 77. Modulation of the guided beam is achieved by imposing an electric signal generated by signal means 79 across upper and lower electrodes 78 and 78'.

The overlapping of short input and output gratings of the invention allows construction of very short modulator segments, since as the beam is input coupled it is simultaneously output coupled. This could permit pixelation of an X-Z array of very small modulators, each independently controlled.

Figure 8:
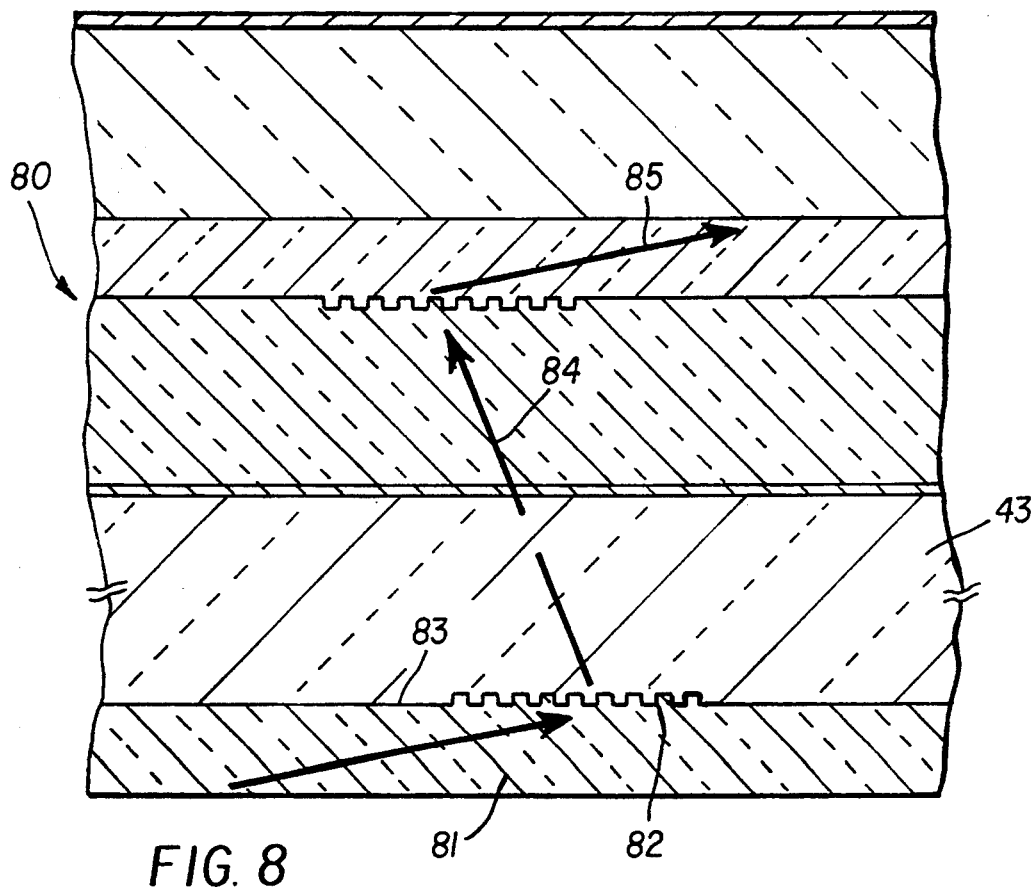
FIG. 8 shows a further embodiment of the apparatus of FIG. 4 wherein the coupling angle of the laser beam coupled into the electro-optic waveguide is controlled by the output grating of an adjacent passive waveguide.

FIG. 8 shows an embodiment 80 in which a passive waveguide 81 with an output grating 82 are in optical contact with back side 83 of substrate 43 of the electro-optic waveguide of FIG. 4. This embodiment allows for co-planar mounting of input laser 39 and improved isolation between input beam 84 and modulated output beam 85.

OPERATION

Referring to FIG. 4, in operation electrical signal generator 47 energizes upper and lower electrodes 41 and 41' creating a high electrical field bias. The index of refraction $n_f$ of waveguide 13 is altered in response to said bias, to a stimulated value $n_f'$ the sign and amplitude of said bias being selected to maximize the value of $n_f'$. Optimum coupling angle $\Theta'$ is also shifted to some other value $\Theta''$.

Laser 39 is energized and emits a laser light beam 40 which passes through transparent substrate 43, lower electrode 41', and transparent cladding layer 14' and impinges on diffraction grating 12 at stimulated optimum input coupling angle $\Theta''$, 22. The angle of laser light beam 40 to substrate 43 is adjusted according to Snell's Law to accommodate the various interfaces between laser 39 and diffraction grating 12, such that the stimulated optimum coupling angle $\Theta''$ 22 is achieved. Laser light beam 40 is then fixed at this position. At this angle, a portion of laser light beam 40 is coupled from radiative mode to guided mode within waveguide 13 and is propagated therein as guided laser light beam 45 at fixed and maximum amplitude.

Signal generator 45 is switched to begin emitting a programmed electrical signal varying in strength between said high bias and zero. The electrical field within waveguide 13 thereby varies, which varies the refractive index of waveguide 13 between $n_f'$ and $n_f$, proportional to the strength of the electric field. Optimum input coupling angle $\Theta'$ is thereby varied. Since the incident laser light beam 40 is fixed at stimulated optimum coupling angle $\Theta''$, the effect of varying said electrical signal is to variably and proportionally decouple laser light beam $\Delta\Theta$ from waveguide 13, thereby modulating the amplitude of guided laser light beam 45. $\Delta\Theta$ of the response curve for the invention is smaller than $\Delta\Theta$ for the non-invention curves, as shown in FIG. 3. Thus, for any given level of electrical signal, a greater depth of modulation is achieved with the invention than with previous modulators. As a consequence, it is possible with the apparatus of the invention to achieve zero coupling of the input beam, and thereby about zero to 100% modulation of the guided beam within the dynamic range of the apparatus.

EXAMPLE

An apparatus of the invention is constructed as described by Robello et al., previously cited, with the addition of a spin-coated indane-derivative lower buffer layer between the glass substrate and the waveguide identical with the upper buffer layer. An input coupling grating is formed in the upper surface of the lower buffer layer as described by L. Li et al. in "Fabrication of photoresist masks for submicrometer surface relief gratings," Proc. SPIE 835, 72–82 (1988), prior to deposition of the electro-optic waveguide material. The nominal parameters of the apparatus are: depth of grating h=0.125 μm; period of grating $\Lambda$=0.29 μm; length of grating $L_g$=2.76 mm; thickness of waveguide t=0.7 μm; thickness of buffer layers=2 μm each; refractive indices, of glass substrate r=1.472, of buffer layers $n_c$=1.569, and a waveguide $n_f$=1.650. The optimum coupling angle $\Theta'$ for a He-Ne laser is 21°, and the coupling length $L_c$ is 5 mm. The electro-optic coefficient of the waveguide material is $r_{33}$=15 picometers/volt.

Imposition of a voltage of ±20 volts electric field across the electrodes is sufficient to shift the coupling angle from the peak value to the first null, or an amplitude modulation of about 100%.

The invention has been described in detail with particular reference to preferred embodiments thereof, but it will be understood that variations and modifications can be effected within the spirit and scope of the invention.

| PARTS LIST FOR FIGS. 1-8 | |
| --- | --- |
| 9 | Laser beam - FIG. 1 |
| 10 | Diffraction - coupled waveguide apparatus - FIG. 1 |
| 11 | Solid line ray trace - FIG. 1 |
| 12 | Diffraction grating - FIGS. 1 and 4 |
| 13 | Waveguide - FIG. 1 |
| 14/14' | Cladding layers - FIG. 4 |
| 15 | Waveguide surfaces - FIG. 5 |
| 16 | Cladding - FIG. 1 |
| 17 | Propagation angle $\phi$ - FIG. 1 |
| 18 | |
| 19 | Input coupling angle $\theta$ - FIG. 1 |
| 20 | |
| 21 | Optimum coupling angle $\theta'$ - FIG. 2 |
| 22 | Stimulated optimum coupling angle $\theta''$ - FIG. 4 |
| 23 | Maximum coupling - FIG. 2 |
| 24 | |
| 25 | Angular width $\Delta\theta$ - FIG. 2 |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | Preferred embodiment of the invention - FIG. 4 |
| 39 | Laser - FIG. 4 |
| 40 | Incident laser light beam - FIG. 4 |
| 41/41' | Upper and lower planar electrodes - FIG. 4 |
| 42 | |
| 43 | Transparent substrate - FIG. 4 |
| 44 | |
| 45 | Guided laser light beam - FIG. 4 |
| 46 | |
| 47 | Signal generator - FIG. 4 |
| 48 | |
| 49 | |
| 50 | Waveguide - FIG. 5 |
| 50'/50''/50''' | Smaller, waveguide segments - FIG. 5 |
| 51 | |
| 52 | Upper electrode - FIG. 5 |
| 52'/52''/52''' | Smaller, upper electrode segments - FIG. 5 |
| 53 | |
| 54 | Lower common electrode - FIG. 5 |
| 55 | |
| 56'/56''/56''' | Independent electrical signal sources - FIG. 5 |
| 57 | Incident laser beam - FIG. 5 |
| 58'/58''/58''' | Independently modulated beams - FIG. 5 |
| 59 | |
| 60 | Channel grooves - FIG. 6 |
| 61 | |
| 62 | |
| 63 | |
| 64 | |
| 65 | |
| 66 | |
| 67 | |
| 68 | |
| 69 | |
| 70 | Waveguide modulator - FIG. 7 |
| 71 | Input coupling grating - FIG. 7 |
| 72 | Output coupling grating - FIG. 7 |
| 73 | Buffer layers - FIG. 7 |
| 74 | Guided laser beam - FIG. 7 |
| 75/75' | Opposite walls of waveguide - FIG. 7 |
| 76 | Output laser beam - FIG. 7 |
| 77 | Input laser beam - FIG. 7 |
| 78/78' | Upper and lower electrodes - FIG. 7 |
| 79 | Signal means - FIG. 7 |
| 80 | Embodiment of double waveguide device - FIG. 8 |
| 81 | Passive waveguide - FIG. 8 |
| 82 | Passive waveguide output grating - FIG. 8 |
| 83 | Back side of substrate - FIG. 8 |

-continued

| PARTS LIST FOR FIGS. 1–8 | |
|---|---|
| 84 | Input beam - FIG. 8 |
| 85 | Modulated output beam - FIG. 8 |
| 86 | |
| 87 | |
| 88 | |
| 89 | |
| 90 | |
| 91 | |
| 92 | |
| 93 | |
| 94 | |

What is claimed is:

1. An apparatus for modulating the amplitude of a laser light beam, comprising:
  a) a waveguide for propagation of a laser beam, comprising an electro-optic material having two surfaces, the index of refraction of said material being changeably responsive to a varying electric field;
  b) means for establishing an electric field within said waveguide;
  c) a diffraction grating for coupling radiative laser light into said waveguide, the length of said grating being shorter than its coupling length; and
  d) means for varying said electric field to vary said index of refraction, thereby modulating the amplitude of light admitted to said waveguide in response to said variations in said electric field.

2. The apparatus of claim 1 wherein said radiative laser light is incident on said diffraction grating at the optimum angle for coupling of said light into said waveguide.

3. The apparatus of claim 1 wherein said length of said grating is between about one-half and one one-hundredth its coupling length.

4. The apparatus of claim 1 wherein said means for establishing an electric field comprises a plurality of electrodes.

5. The apparatus of claim 1 wherein said electric field exists in that portion of said waveguide adjacent said diffraction grating.

6. The apparatus of claim 1 wherein said diffraction grating is formed in one of said surfaces.

7. The apparatus of claim 1 wherein said electro-optic material comprises organic compounds having chromophores with methylsulfonyl electron-acceptor groups.

8. The apparatus of claim 1 further comprising buffer regions outside said waveguide in optical contact with both said surfaces, the index of refractions of said buffer regions being at all times lower than the index of refraction within said waveguide, thereby assuring a critical internal reflection angle.

9. The apparatus of claim 1 wherein said means for varying said electric field comprises electrodes and an electrical drive circuit connected across said electrodes.

10. An apparatus for modulating the amplitude of a laser light beam, comprising:
  a) a thin-film waveguide for propagation of a laser beam, comprising:
    i) two spaced-apart parallel surfaces, and
    ii) a transparent electro-optic layer between said surfaces, the index of refraction of said layer being higher than that of its surroundings and changeably responsive to a varying electric field;
  b) a diffraction grating at one of said two surfaces for coupling radiative laser light into said waveguide, said grating being shorter in the direction of propagation than the coupling length of the incident beam;
  c) an electrode adjacent to each of said two surfaces in proximity to said diffraction grating.
  d) signal means operably connected across said electrodes for imposing a varying electric field on said electro-optic layer so that said radiative laser light will be variably coupled into said waveguide, whereby the amplitude of laser light within said waveguide is modulated in response to said signal means.

11. The apparatus of claim 10 further comprising a diffraction grating for coupling said laser light beam into said waveguide, wherein said coupling of said laser light beam is characterized by a $sinc^2$ function.

12. The apparatus of claim 11 wherein said diffraction grating is shorter than the intensity profile of said laser light beam.

13. The apparatus of claim 11 wherein said diffraction grating is shorter than the coupling length of said laser light beam.

14. A method of modulating the amplitude of incident laser radiation transmitted by a waveguide which comprises:
  impinging said laser radiation onto a diffraction grating of a waveguide comprising an electro-optic material, said radiation being impinged on said grating at the angle of maximum coupling for said radiation and electro-optic material, thereby producing maximum amplitude of coupled radiation, the length of said grating being less than the waist diameter of the incident radiation and less than the coupling length of said radiation with respect to said grating;
  establishing an electric field across said waveguide; and
  changing said field to change the refractive index of said electro-optic material, whereby the amplitude of said coupled radiation is changed to a value less than said maximum amplitude.

* * * * *